(12) United States Patent
Oosaka et al.

(10) Patent No.: US 8,744,033 B2
(45) Date of Patent: Jun. 3, 2014

(54) PASSAGE SELECTOR OF REACTOR IN-CORE NUCLEAR-MEASURING APPARATUS

(75) Inventors: Kenji Oosaka, Chiyoda-ku (JP); Masami Yodogawa, Chiyoda-ku (JP)

(73) Assignee: Mitsubishi Electronic Corporation, Chiyoda-Ku, Tokyo (JP)

( * ) Notice: Subject to any disclaimer, the term of this patent is extended or adjusted under 35 U.S.C. 154(b) by 489 days.

(21) Appl. No.: 12/271,056

(22) Filed: Nov. 14, 2008

(65) Prior Publication Data

US 2009/0316851 A1 Dec. 24, 2009

(30) Foreign Application Priority Data

Jun. 18, 2008 (JP) ................. 2008-159330

(51) Int. Cl.
*G21C 17/00* (2006.01)
*G21C 17/108* (2006.01)
(52) U.S. Cl.
CPC .............. *G21C 17/00* (2013.01); *G21C 17/108* (2013.01); *Y02E 30/40* (2013.01)
USPC ............................ 376/245; 376/254; 376/259
(58) Field of Classification Search
CPC ....... G21C 17/00; G21C 17/108; Y02E 30/40
USPC .......................................... 376/245, 254, 259
See application file for complete search history.

(56) References Cited

U.S. PATENT DOCUMENTS

2005/0154478 A1* 7/2005 Song et al. ..................... 700/57

FOREIGN PATENT DOCUMENTS

| JP | 49-042399 U | 4/1974 |
|---|---|---|
| JP | 59-116097 A | 7/1984 |
| JP | 1-202696 A | 8/1989 |
| JP | 2-293696 A | 12/1990 |
| JP | 4-221794 A | 8/1992 |
| JP | 04-235392 | 8/1992 |
| JP | 04328496 A | * 11/1992 |
| JP | 06000743 A | * 1/1994 |
| JP | 06-087760 U | 12/1994 |
| JP | 2005-195572 A | 7/2005 |

OTHER PUBLICATIONS

J. Pieri, Thomson Industries, Inc., "Selecting and Applying Clutches and Brakes for Optimal Performance and Long Service Life", pp. 1-8.*
Human Translation of JP 04328496A, Nov. 17, 1992, pp. 1-22.*

* cited by examiner

*Primary Examiner* — Frank J McGue
(74) *Attorney, Agent, or Firm* — Buchanan Ingersoll & Rooney PC

(57) ABSTRACT

An object of the invention is to embody a small and inexpensive passage selector, which can be applied by commonly using an index device even if the number of detector passages is changed, and which is easy to make inspection and maintenance. The passage selector of a reactor in-core nuclear-measuring apparatus of the invention includes: a drive motor; an index device that is driven by the drive motor and that makes a rotary output of a predetermined index number; a central rotating shaft that is driven to rotate by the index device and that causes a passage selecting guide tube to be located in opposition to any detector passage; and a speed-increasing and decreasing device that is interposed between an output shaft of the index device and the central rotating shaft, and that adjusts the index number of the central rotating shaft.

2 Claims, 5 Drawing Sheets

PASSAGE SELECTOR APPLICATION EXAMPLE

| ROTATING INDEX STOP NUMBER Y | 6 |
|---|---|

| | Z1 | 90 |
|---|---|---|
| (1) PASSAGE SELECTOR | Z2 | 75 |
| | CENTRAL ROTATING SHAFT STOP NUMBER | 5 |

| | Z1 | 85 |
|---|---|---|
| (2) PASSAGE SELECTOR | Z2 | 85 |
| | CENTRAL ROTATING SHAFT STOP NUMBER | 6 |

| | Z1 | 60 |
|---|---|---|
| (3) PASSAGE SELECTOR | Z2 | 100 |
| | CENTRAL ROTATING SHAFT STOP NUMBER | 10 |

| | Z1 | 60 |
|---|---|---|
| (4) PASSAGE SELECTOR | Z2 | 150 |
| | CENTRAL ROTATING SHAFT STOP NUMBER | 15 |

| | Z1 | 60 |
|---|---|---|
| (5) PASSAGE SELECTOR | Z2 | 200 |
| | CENTRAL ROTATING SHAFT STOP NUMBER | 20 |

| | Z1 | 50 |
|---|---|---|
| (6) PASSAGE SELECTOR | Z2 | 200 |
| | CENTRAL ROTATING SHAFT STOP NUMBER | 24 |

Z1: TEETH NUMBER ON ROTARY INDEX SIDE
Z2: TEETH NUMBER ON CENTRAL ROTATING SHAFT SIDE

PASSAGE SELECTOR OF REACTOR IN-CORE NUCLEAR-MEASURING APPARATUS

BACKGROUND OF THE INVENTION

1. Field of the Invention

The present invention relates to an in-core nuclear-measuring apparatus of a reactor and, more particularly, to a passage selector acting for selectively switching a passage selecting guide tube through which a detector cable goes with respect to a predetermined number of detector passages in the in-core nuclear-measuring apparatus.

2. Description of the Related Art

To measure a neutron flux to be discharged from fuel in a reactor core, the nuclear-measuring facilities for nuclear power plants are generally provided with a passage selector in which a cable equipped with a neutron detector at the leading end is selectively inserted into a plurality of detector passages. Although varied in number depending on its capacity, a reactor is provided with multiple detector passages, and the neutron detector is selectively inserted into these detector passages using the above-mentioned passage selector, thereby enabling to efficiently perform a remote detection of a neutron flux with small numbers of equipments. The construction of nuclear-measuring facilities of a reactor is described in detail, for example, in the Japanese Patent Publication (unexamined) No. 195572/2005.

The conventional passage selector is of a system in which by a turning force of a drive motor, a passage selecting guide tube is brought in rotation directly through an index device of various cam mechanisms. As the index mechanism of the above-mentioned cam mechanism, for example, a known roller gear cam mechanism, parallel cam mechanism, and Geneva mechanism can be employed. Furthermore, as the mechanism for positioning the passage selecting guide tube in rotation at an arbitrary detector passage, a mechanism that is referred to as a click stopper system, in which a hard sphere is pressed onto a rotary wheel by a spring force, is generally employed.

FIG. 5 is a view illustrating a schematic construction of a passage selector formed in the above-mentioned click-stopper system. In the drawing, reference numeral 1 designates a housing, numeral 2 designates a central rotating shaft, and numerals 3 and 4 designate disks that are provided at both ends of the above-mentioned housing 1 and supported by a fixed rod 15. Numeral 5 designates a passage selecting guide tube that comes in the housing 1 from the center of the above-mentioned disk 3, and going through an internal part of the above-mentioned central rotating shaft 2, comes out of the central rotating shaft 2 on the way, to be connected to the disk 4. In the internal part of this guide tube, a cable (not illustrated), to the leading end of which a neutron detector (not illustrated) is attached, is inserted to go through.

Numeral 6 designates a drive motor equipped with a reduction gear, which is directly connected to the shaft of an electromagnetic clutch 7 and fixed to the disk 3. Numeral 8 designates a first gear that is attached to the electromagnetic clutch 7, and meshes with a second gear 9 that is attached to the above-mentioned central rotating shaft 2. That is, these components form an index device directly performing a rotation index of the central rotating shaft 2 by gear ratio setting between the above-mentioned first gear 8 and second gear 9 with the rotation of the drive motor 6. The above-mentioned passage selecting guide tube 5 rotates by the same angle as that of the above-mentioned central rotating shaft 2, so that the above-mentioned passage selecting guide tube 5 is brought in rotation by a predetermined angle having been indexed by means of this index device to select a predetermined passage.

The second gear 9 is provided with a cam 10 causing a passage selecting switch 11 to operate. When this cam 10 causes a predetermined passage selecting switch 11 to operate, the power from the drive motor 6 is to be shut off (for example, refer to the Japanese Patent Publication (unexamined) No. 202696, 1989). Furthermore, the central rotating shaft 2 is disconnected due to that the power from the electromagnetic clutch 7 is shut off. In addition, the above-mentioned shaft 2, which otherwise passes by an inertial force of a wheel 12 is made to mechanically stop owing to that a click stopper 14 is pressed onto a dish-shaped groove 13 that is provided in the wheel 12. The click stopper 14, as described above, is constructed so that a hard sphere is pressed by a spring onto the wheel 12 going to rotate, which is the reason of being referred to as a click stopper system.

SUMMARY OF THE INVENTION

In the above-mentioned conventional selectors, however, the above-mentioned passage selecting guide tube 5 is rotated directly by the above-mentioned index device, and thus a predetermined passage is to be selected. Therefore, every time the number of detector passages is changed, a new index device has to be designed and manufactured, or index devices of different index numbers have to be prepared for respective selectors of different detector passage numbers.

Furthermore, in the above-mentioned conventional click stopper system, when the passage selection number is increased, the diameter of the wheel 12 is necessarily enlarged to have a larger number of exit passages. When the diameter of the wheel 12 comes to be larger, since the inertial mass is increased so much, there is a larger possibility that the wheel 12 is not stopped at a predetermined selected position due to its inertial force (never more than about 15 passage selection numbers). Moreover, it is necessary to periodically adjust the pressing force of the click stopper.

Additionally, in the above-mentioned conventional device, an electromagnetic clutch for not transmitting a driving force is required, and two power supplies of a power supply (normally AC 100V) for a drive motor and a power supply (normally DC 24V) for an electromagnetic clutch become necessary. In addition, when oil contents and moisture contents stick to a friction plate of the electromagnetic clutch, the friction plate gets slippery and thus the force of transmission is decreased, and the drive side may run idle not to rotate. Furthermore, it is necessary to measure a transmission torque and a braking torque every year, and when these torques come to be outside a reference value, it is necessary to replace the electromagnetic clutch. Moreover, since in the passage selector, pressure application at normal operation time and vacuuming at periodic inspection time are repeated, a further problem exists in that oil contents having been used at, e.g., ball bearings have gradually stuck to the friction plate, and thus the transmission torque is reduced with age.

The present invention was made to solve the above-described problems, and has an object of obtaining a passage selector that can be applied by commonly using an index device even if the number of detector passages is changed.

The invention has another object of obtaining a passage selector, which needs not to employ any electromagnetic clutch or a click stopper system that is easy to make inspection and maintenance, and small in size and inexpensive.

A passage selector of a reactor in-core nuclear-measuring apparatus according to the invention includes: a drive motor;

an index device that is driven by the mentioned drive motor and that makes a rotary output of a predetermined index number; a central rotating shaft that is driven to rotate by the mentioned index device and that causes a passage selecting guide tube to be located in opposition to any detector passage; and a speed-increasing and decreasing device that is interposed between an output shaft of the mentioned index device and the central rotating shaft, and that adjusts the index number of the mentioned central rotating shaft.

According to this invention, due to that a speed-increasing and decreasing mechanism is interposed between the index device and the central rotating shaft, there is an advantage of obtaining a small and inexpensive passage selector that can be applied to an arbitrary number of detector passages by commonly using the existing index device without designing a new index device even if the detector passage number is changed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a table explaining an adjustment method of an index number of a central rotating shaft with varying teeth number.

DESCRIPTION OF THE PREFERRED EMBODIMENTS

Embodiment 1

Figure 1:
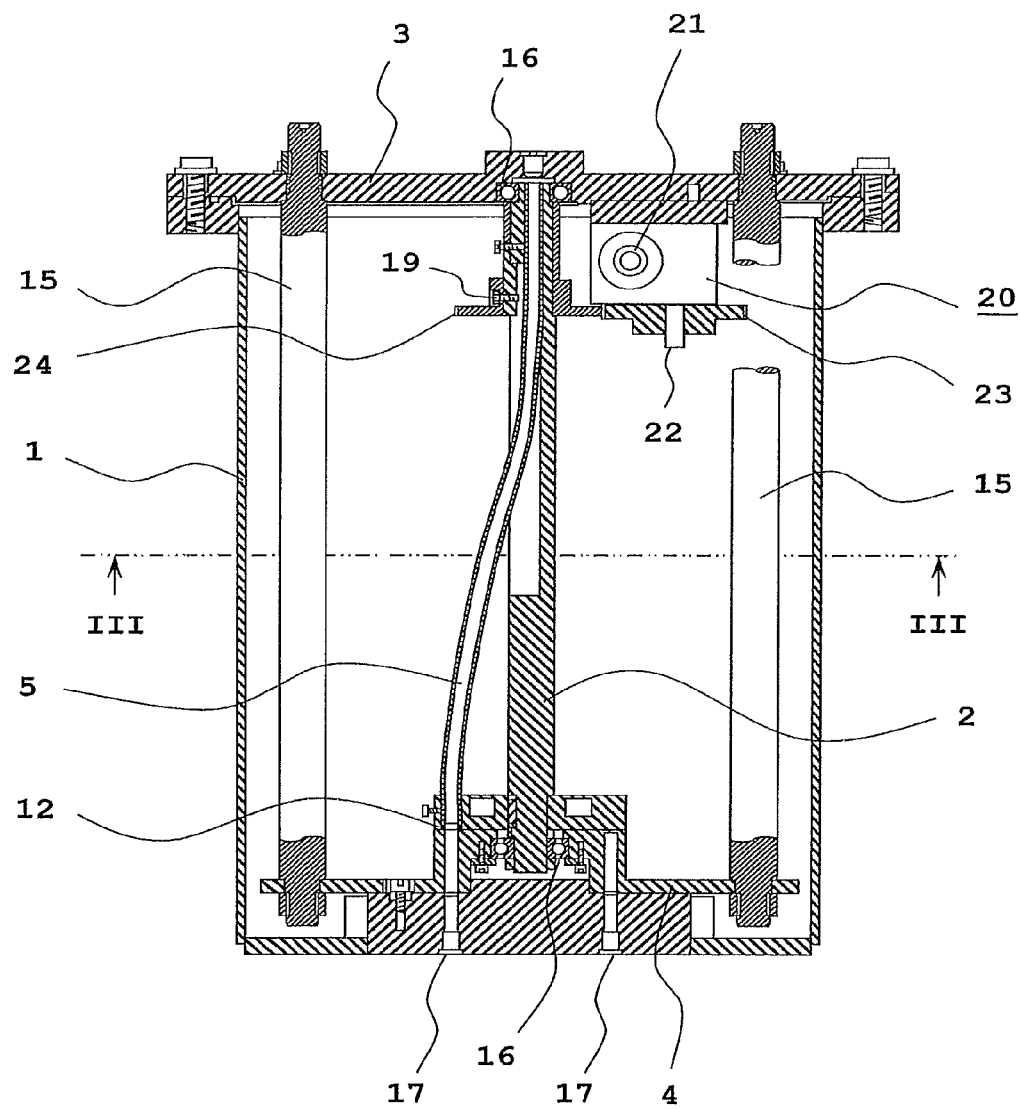
FIG. 1 is a sectional side view illustrating a passage selector of an in-core nuclear-measuring apparatus for a reactor according to a first exemplary embodiment of the present invention.
Figure 2:
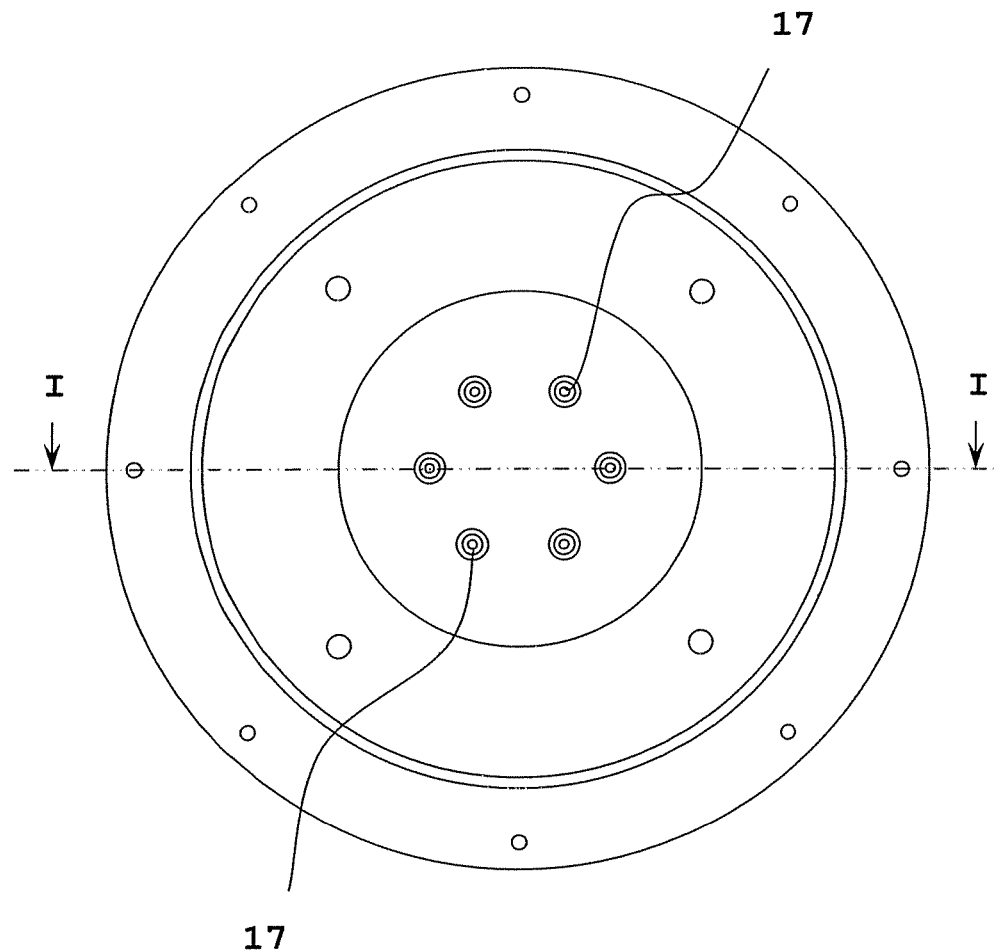
FIG. 2 is a bottom view of FIG. 1.
Figure 3:
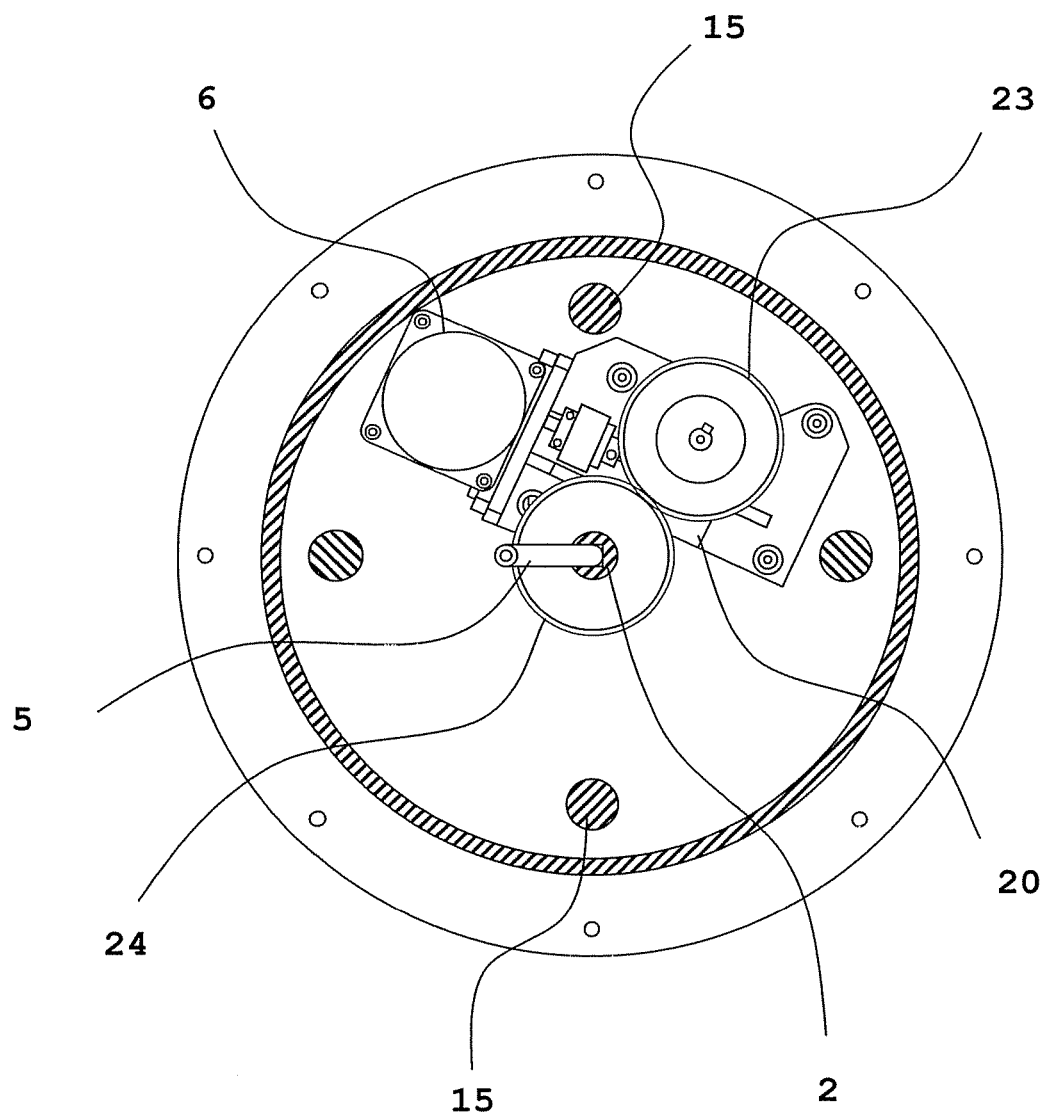
FIG. 3 is a sectional view taken along the line III-III of FIG. 1.
Figure 5:
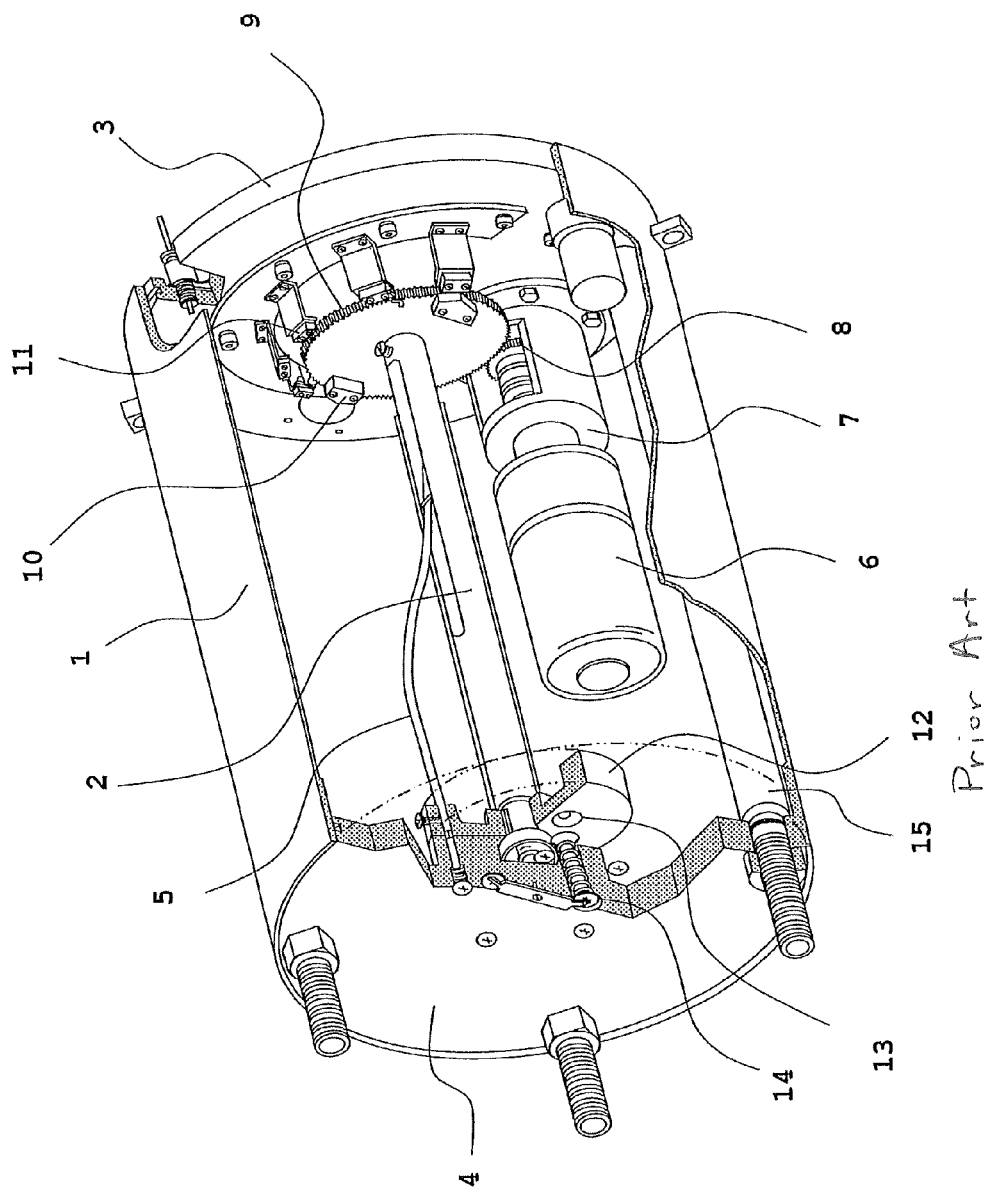
FIG. 5 is a sectional side view of a conventional passage selector.

A first embodiment of the present invention is hereinafter described. FIG. 1 illustrates a sectional side view of a passage selector of a reactor in-core nuclear-measuring apparatus according to the invention, and FIG. 2 is a bottom view of FIG. 1. FIG. 3 is a sectional view taken along the line III-III of FIG. 1, and FIG. 4 is a table explaining an adjustment method of an index number of a central rotating shaft with varying teeth number. In the drawings, the same reference numerals designate the same or like parts to those of the conventional selector shown in FIG. 5. In the drawing, there are provided upper and lower disks 3 and 4 supported by four fixed rods 15 in a housing 1. With these disks, a central rotating shaft 2 is rotatably supported by a bearing 16.

Numeral 5 designates a passage selecting guide tube that comes in the housing 1 from the center of the above-mentioned disk 3 and goes through an internal part of the above-mentioned central rotating shaft 2, comes out of the central rotating shaft 2 on the way, and connected to the disk 4. In the internal part of this guide tube, a cable (not illustrated), to the leading end of which a neutron detector (not illustrated) is attached, is inserted to go through.

Furthermore, numerals 17 designate plural numbers (six numbers in this embodiment) of detector passages that are bored in the lower disk 4. Although not illustrated, through these detector passages, a detector that is mounted at the leading end of the cable is inserted in and removed from the reactor core. Incidentally, the above-mentioned wheel 12 is provided for the purpose of holding the passage selecting guide tube 5 and preventing foreign substances coming in the detector passage 17 that is not selected.

Numeral 20 designates a known index device, which includes an input shaft 21 that receives a rotary input from a drive motor 6 (a gear motor in this example), and an output shaft 22 that makes an output of a predetermined index rotation angle. Numeral 23 designates a first gear connected to the output shaft 22 of the above-mentioned index device 20. Numeral 24 designates a second gear connected to the central rotating shaft 2 so as to mesh with the above-mentioned first gear 23. With these gears 23 and 24, the output from the index device 20 is increased or decreased in speed to adjust the index number of the central rotating shaft 2.

Now, operation of the invention is described. Every time the input shaft 21 of the index device 20 is allowed to make one revolution by the gear motor 6, the output shaft 22 of the index device 20 makes 1/Y revolution in accordance with an index number Y that is specific to the index device 20. In the same manner, the first gear 23 that is fixed to the output shaft 22 of the index device 20 also makes 1/Y revolution, and the second gear 24 that meshes with the first gear 23 is brought in rotation as well. At this time, when letting the teeth number of the first gear 23 Z1 and letting the teeth number of the second gear 24 Z2, every time the input shaft 21 of the index device 20 makes one revolution, the second gear 24, that is, the central rotating shaft 2 is to make 1/Y×Z1/Z2 revolution.

As mentioned above, in the first embodiment according to the invention, due to that a speed-increasing and decreasing device that is formed of the first gear 23 and the second gear 24 is interposed between the indexing device 20 and the central rotating shaft 2, by suitably varying the teeth number of the above-mentioned first gear 23 and second gear 24, the index number of the central rotating shaft 2 can be changed comparatively easily.

FIG. 4 is a table for explaining the adjustment method of the index number of the central rotating shaft 2 with varying teeth number. The table is a case of applying the selector to a rotary index device, and shows changes in a stop number (index number) of the central rotating shaft 2 in the case where the teeth number Z1 of the above-mentioned first gear 23 and the teeth number Z2 of the second gear 24 are suitably varied.

First, letting the stop number Y (index number) of the rotary index device 20, in the case (1) where Z1 is 90 and Z2 is 75, the stop number (index number) of the central rotating shaft 2 is 5. In the case (2) where Z1 is 85 and Z2 is 85, the stop number (index number) of the central rotating shaft 2 is 6. In the case (3) where Z1 is 60 and Z2 is 100, the stop number (index number) of the central rotating shaft 2 is 10. In the case (4) where Z1 is 60 and Z2 is 150, the stop number (index number) of the central rotating shaft 2 is 15. In the case (5) where Z1 is 60 and Z2 is 200, the stop number (index number) of the central rotating shaft 2 is 20. In the case (6) where Z1 is 50 and Z2 is 200, the stop number (index number) of the central rotating shaft 2 is 24.

Therefore, as is obvious from the above-mentioned descriptions, the stop number (index number) of the central rotating shaft 2 is Y×Z2/Z1, and thus it is understood that the index number of the central rotating shaft 2 can be changed comparatively easily. A variety of combinations of the teeth number of the above-mentioned first gear 23 and the teeth number of the above-mentioned second gear 24 can be achieved by suitably replacing the above-mentioned first gear 23 and second gear 24 in accordance with the increase or decrease of detector passage numbers with the use of a screw 19.

Thus, according to the invention, owing to that the index device can be commonly used regardless of the number of detector passages, a passage selector that is inexpensive and highly versatile can be embodied.

Incidentally, although in the above-mentioned first embodiment, an example in which the speed-increasing and decreasing device is formed of a gear train is described, it is not limited to this example. Such a speed-increasing and decreasing device can be formed of the combination of a toothed belt and a pulley or the combination of a chain and a sprocket. Additionally, the teeth number of the pulley in the case of the toothed belt and the pulley, or the teeth number of the sprocket in the case of the chain and the sprocket can be changed in combination as in the case of the gear train, thereby enabling to obtain the speed-increasing and decreasing device. In addition, although the drive source is described taking a gear motor as an example, it is not limited thereto, and the same advantage can be achieved with a servo motor or a stepping motor. Furthermore, although the index device is described taking a rotary index device as an example, it is not limited thereto. A parallel cam system or a Geneva mechanism can be selected without restraint within the scope of the invention as a matter of course.

What is claimed is:

1. A passage selector of a reactor in-core nuclear-measuring apparatus, comprising:
   a passage selecting guide tube;
   a plurality of detector passages;
   a drive motor;
   an index device that is driven by said drive motor, the index device including an output shaft that makes a rotary output of a fixed predetermined index number;
   a central rotating shaft that is rotated so as to cause the passage selecting guide tube to be aligned to a detector passage; and
   a speed-increasing and decreasing device that comprises a first gear directly connected to the output shaft of the index device and a second gear that is meshed with said first gear and directly connected to said central rotating shaft; and
   wherein when a stop number (index number) of the index device is Y where a teeth number of the first gear is Z1, and a teeth number of the second gear is Z2, the stop number (index number) of the central rotating shaft is Y×Z2/Z1.

2. A passage selector of a reactor in-core nuclear-measuring apparatus, comprising:
   a passage selecting guide tube;
   a plurality of detector passages;
   a drive motor;
   an index device that is driven by said drive motor, the index device including an output shaft that makes a rotary output of a fixed predetermined index number;
   a central rotating shaft that is rotated so as to cause the passage selecting guide tube to be aligned to a detector passage; and
   a speed-increasing and decreasing device that comprises a first gear directly connected to the output shaft of the index device and a second gear that is meshed with said first gear and directly connected to said central rotating shaft; and
   wherein when an input shaft of the index device makes one revolution by the drive motor, an output shaft of the index device makes 1/Y revolution in accordance with an index number Y that is specific to the index device, where a teeth number of the first gear is Z1, and a teeth number of the second gear is Z2, the revolutions of the central rotating shaft is set to be 1/Y×Z1/Z2.

* * * * *